United States Patent
Paweletz et al.

[11] Patent Number: 5,555,715
[45] Date of Patent: Sep. 17, 1996

[54] SHAFTLESS SPINNING ROTOR OF AN OPEN-END SPINNING MACHINE

[75] Inventors: Anton Paweletz, Fellbach; Wilhelm Birkenmaier, Weinstadt, both of Germany

[73] Assignee: SKF Textilmaschinen-Komponenten GmbH, Stuttgart, Germany

[21] Appl. No.: 354,626

[22] Filed: Dec. 13, 1994

[30] Foreign Application Priority Data

Dec. 14, 1993 [DE] Germany .................. 43 42 539.9

[51] Int. Cl.⁶ ................ D01H 4/00; F16C 32/06
[52] U.S. Cl. ................ 57/414; 57/406; 310/86; 310/90; 384/122
[58] Field of Search .............. 57/404, 414, 406, 57/92; 384/121, 123; 310/268, 67 R, 90, 169, 86

[56] References Cited

U.S. PATENT DOCUMENTS

| | | | |
|---|---|---|---|
| 4,319,449 | 3/1982 | Hofmann | 57/404 |
| 4,503,663 | 3/1985 | Oexler | 57/404 |

FOREIGN PATENT DOCUMENTS

| | | | |
|---|---|---|---|
| 2939326 | 4/1981 | Germany . | |
| 3815182 | 11/1989 | Germany | 57/414 |
| 4207673 | 3/1992 | Germany . | |
| 4104250 | 8/1992 | Germany . | |
| 359313 | 1/1973 | U.S.S.R. . | |
| 1687660 | 10/1991 | U.S.S.R. . | |
| 9201096 | 1/1992 | WIPO . | |
| 9201097 | 1/1992 | WIPO . | |

*Primary Examiner*—William Stryjewski
*Attorney, Agent, or Firm*—Herbert L. Lerner; Laurence A. Greenberg

[57] ABSTRACT

An open-end spinning machine has spinning stations and a magnetic and gas bearing with a stator at each of the spinning stations. A shaftless spinning rotor being electrically drivable with a single motor includes a series of spinning cups with different properties at each of the spinning stations for receiving fibers to be spun, and an electric rotor at each of the spinning stations forming an axial field motor with the magnetic and gas bearing and the stator. The spinning cups and the electric rotor have axially opposing end surfaces, and the end surfaces of the electric rotor and of one of the spinning cups at a time are coupled together to form a functionally appropriately releasable connection as a structural unit at each of the spinning stations.

14 Claims, 9 Drawing Sheets

SHAFTLESS SPINNING ROTOR OF AN OPEN-END SPINNING MACHINE

BACKGROUND OF THE INVENTION

1. Field of the Invention

The invention relates to a shaftless spinning rotor of an open-end spinning machine, which is electrically drivable with a single motor and which includes a spinning cup that receives fibers to be spun and an electric rotor disposed on the spinning cup, wherein the spinning rotor forms an axial field motor through a magnet and gas bearing with a stator.

As the development of rotor spinning machines progresses, the goal is not only to improve the quality of the yarns produced, but above all to increase production. A key role in increasing production is played by the rotary speed of the spinning rotor. For that reason, the most various kinds of drives and bearings for spinning rotors have been developed, in order to reach rotary speeds of markedly over 100,000 rpm. Reducing the rotor diameter and mass and lowering friction losses permits not only a higher rotary speed, but also reduced energy consumption when driven.

In that respect, shaftless spinning rotors, which are constructed as the rotor of an axial field motor, can be considered especially advantageous. A combined magnet and gas bearing assures relatively low friction losses.

A shaftless open-end spinning rotor for a combined magnet and gas bearing is known from Published International Application WO 92/01097. The shaftless spinning rotor described therein includes a spinning cup which receives the fibers to be spun, and an electric rotor disposed on the spinning cup and cooperating with a stationary stator.

Given the high yarn quality demanded today, the service life of the spinning rotor is limited by wear in the spinning groove, so that after a certain time, replacement of the spinning rotor is inevitable.

SUMMARY OF THE INVENTION

It is accordingly an object of the invention to provide a shaftless spinning rotor of an open-end spinning machine, which overcomes the hereinafore-mentioned disadvantages of the heretofore-known devices of this general type and which can work without limitations in terms of yarn quality.

With the foregoing and other objects in view there is provided, in accordance with the invention, in an open-end spinning machine having spinning stations and a magnetic and gas bearing with a stator at each of the spinning stations, a shaftless spinning rotor being electrically drivable with a single motor, comprising a series of spinning cups with different properties at each of the spinning stations for receiving fibers to be spun; and an electric rotor at each of the spinning stations forming an axial field motor with the magnetic and gas bearing and the stator; the spinning cups and the electric rotor having axially opposing end surfaces, and the end surfaces of the electric rotor and of one of the spinning cups at a time being coupled together to form a functionally appropriately releasable connection as a structural unit at each of the spinning stations.

Constructing the spinning cup and the electric rotor as separate structural units, which are coupled to one another by means of a functionally properly releasable connection, allows the replacement from wear caused by fiber contact to be limited to merely the part of the spinning rotor that is in fact exposed to the wear. In comparison with the entire spinning rotor, a spinning cup of this kind can be produced very economically. For this reason it is even possible to use spinning cups that wear faster than in the prior art. The only comparison that needs to be made is whether replacing lower-cost spinning cups at short intervals or higher-cost spinning cups at longer intervals is most effective.

However, the invention not only includes the replacement of spinning cups that differ from one another in their properties, especially with respect to wear, but also the replacement of spinning cups of different spinning properties or dimensions. When a change is made to a different batch, a different fiber length can require a different rotor diameter, or different fiber properties or mixture proportions can require different internal contours of the spinning cup. Replacing spinning cups in this way is also within the scope of the present invention. The electric rotor, which is adapted in its dimensions to the stationary stator, need not be changed.

In accordance with another feature of the invention, since the electric rotor advantageously has an array of permanent magnets for driving and centering it, the coupling of the spinning cup and the electric rotor can be performed very simply by magnetic adhesion.

In accordance with a further feature of the invention, the bottom of the spinning cup is formed of a ferromagnetic material that forms a yoke for the magnetic field lines. Within the scope of the invention it is possible either to fabricate the entire spinning cup from a ferromagnetic material or only to make the bottom of the spinning cup of ferromagnetic material. This bottom can also be made in multiple layers. For instance, the main portion of the spinning cup may be formed of a nonmagnetic material such as aluminum, and a plate of soft magnetic material may be glued to the bottom or pressed onto it by form-locking. A form-locking connection is one which connects two elements together due to the shape of the elements themselves, as opposed to a force-locking connection, which locks the elements together by force external to the elements.

In accordance with an added feature of the invention, since the magnetic adhesion, especially in the event of major acceleration or braking events, as a rule might not suffice to secure centering and torque transmission, form-locking elements should advantageously be used for this purpose.

In accordance with an additional feature of the invention, drivers are combined with corresponding indentations in the other part.

In accordance with yet another feature of the invention, in order to provide torque transmission during the drive, relatively steep lateral surfaces mesh with one another and form a secure form lock. During braking, the magnetic force counteracts the separation of the two independent parts. Thus in the attempt to overtake the electric rotor, the spinning cup would have to execute an axial motion as well because of the inclines following the lateral surfaces. Yet the magnetic force acts in the axial direction, and is still further reinforced by the drive magnets because of the higher braking current as compared with normal operation.

However, it is also possible to absorb not only torque and radial forces but also axial forces by means of the coupling elements.

In accordance with yet a further feature of the invention, a threaded embodiment of a centrally disposed part has a self-locking effect, depending on the pitch, and if the magnet force is also employed in order to attain an axial force, then a high pitch can produce a similar effect, in the manner of a corkscrew, to that explained in connection with the already-described drivers.

It should be recalled that in magnet adhesion, as a rule such high axial forces arise that vertically separating the parts is not possible. Suitable inclined guides simultaneously with the rotation of the parts make it possible to overcome the axial magnetic forces. It should be recalled that because of the disposition of drivers for centering or absorption of axial and radial forces, it is not possible to displace the parts in the plane of mutual contact.

If self-locking connections are chosen, then the magnetic force can be dispensed with to attain axial forces. In that case, the spinning cup can be entirely formed of a nonmagnetic material, and then the yoke for the drive magnets is disposed solely in the electric rotor.

In accordance with yet an added feature of the invention, the self-locking coupling elements are involute configurations or screw connections.

In accordance with yet an additional feature of the invention, the spinning cup and electric rotor are coupled by means of a releasable adhesive connection. This assumes that it is acceptable to destroy a spinning cup that is to be replaced anyway because it is worn. Care must merely be taken to ensure that the electric rotor not be damaged when the adhesive connection is undone.

With the objects of the invention in view, there is also provided in a shaftless open-end spinning rotor having an electric rotor with an end surface, a spinning cup, comprising an end surface being axially opposed to the end surface of the electric rotor, and means for functionally releasable connecting the end surface of the spinning cup to the end surface of the electric rotor.

Other features which are considered as characteristic for the invention are set forth in the appended claims.

Although the invention is illustrated and described herein as embodied in a shaftless spinning rotor of an open-end spinning machine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1A:
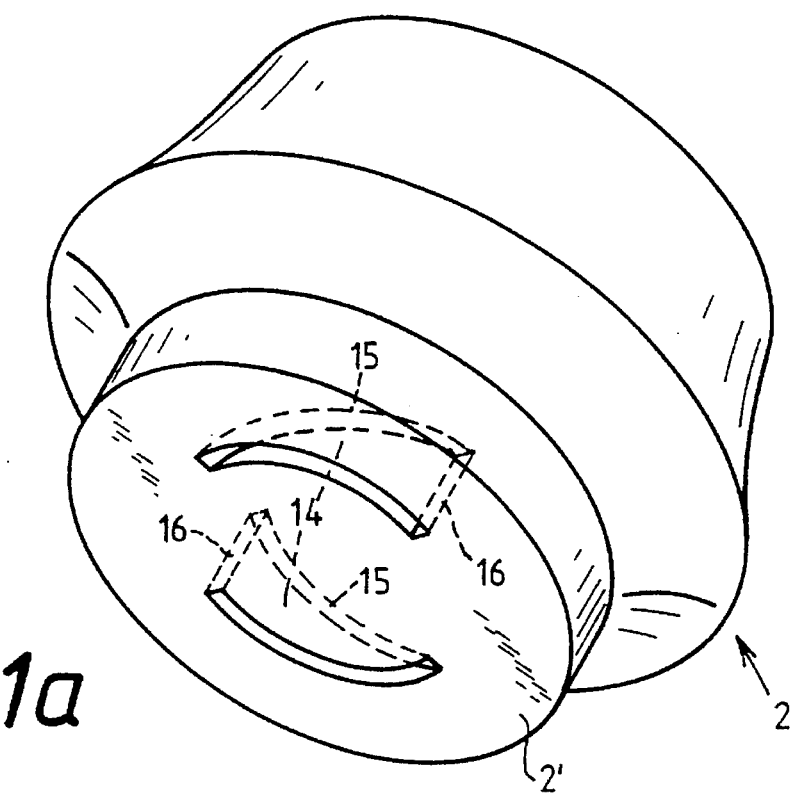
FIG. 1a is a diagrammatic, perspective view a spinning cup according to the invention.
Figure 1B:
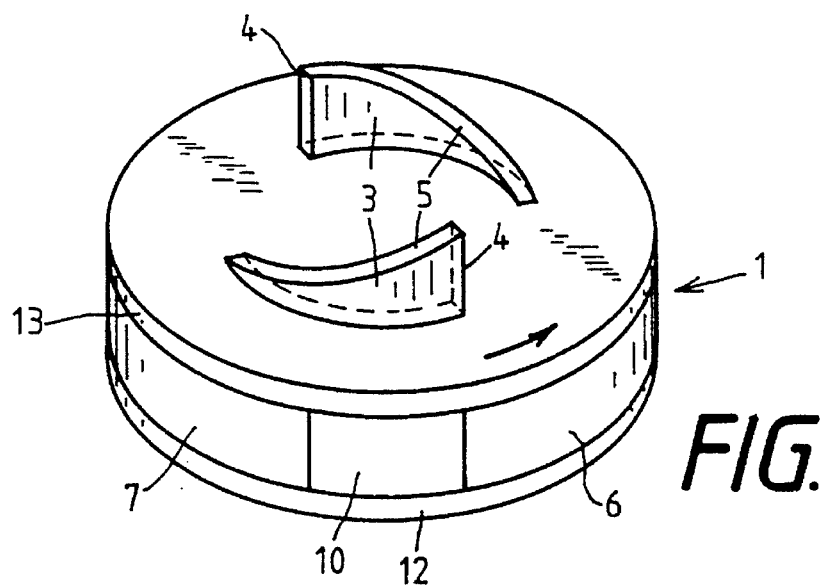
FIG. 1b is a perspective view of an electric rotor fitting the spinning cup.
Figure 1C:
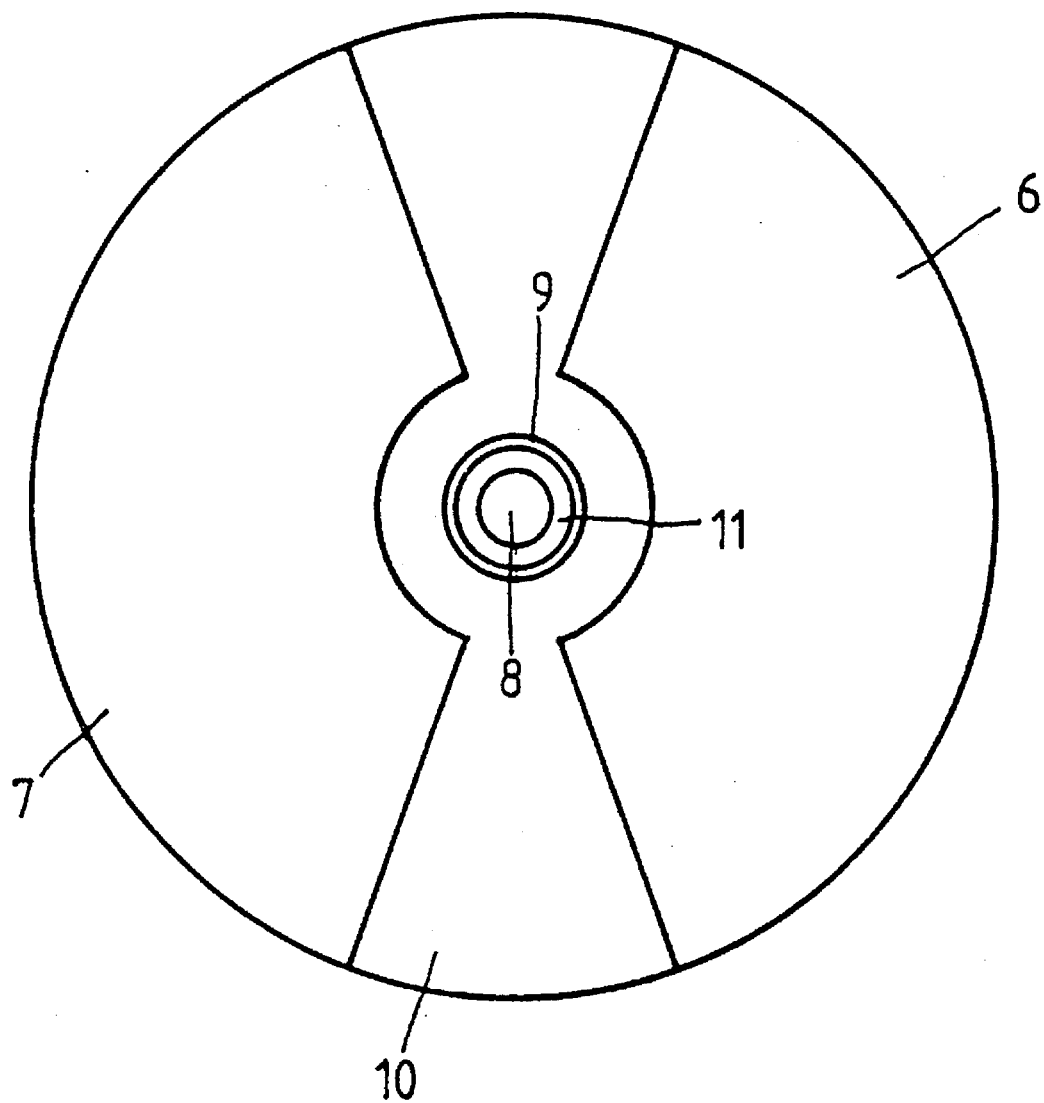
FIG. 1c is a horizontal-sectional view of the electric rotor of FIG. 1b illustrating a magnet array.

Referring now to the figures of the drawing in detail and first, particularly, to FIGS. 1a–1c thereof, there is seen a first variant of an embodiment of a shaftless spinning rotor according to the invention. FIGS. 1a and 1b show an electric rotor 1 and an associated spinning cup 2.

The electric rotor 1 has a surface to be joined to the spinning cup 2 on which concentrically disposed drivers 3 are disposed. These drivers 3 have lateral surfaces or flanks 4 that protrude vertically from the surface and are located at the front in terms of the intended drive direction of the electric rotor 1. Opposite the intended rotary direction of the electric rotor 1, the drivers 3 have extensions, which have backs 5 of decreasing height. Corresponding indentations 14 which are provided on the side of the spinning cup 2 to be joined to the electric rotor 1 have equally steep lateral surfaces or flanks 16 and extensions with backs 15 of decreasing depth. The drivers 3 and indentations 14 are advantageously dimensioned identically except for a minimal tolerance. As a result, with the cooperation of an axial magnetic force to be described below, a secure connection is attained between the electric rotor 1 and the spinning cup 2. Above all, centering, the absorption of torque and radial forces, is attained. The absorption of the radial forces essentially serves the purpose of centering itself.

Drive magnets 6 and 7 (which are also seen in FIG. 1c) in this case are embedded in supporting layers 12 and 13, as is known from Published International Application WO 92/01097, which defines the generic structure, and these layers advantageously include fixed laminates in the form of circular disks. An insulation layer 10 is inserted between the drive magnets 6 and 7. Besides insulating the magnetic fields from one another, the insulation layer 10 also takes on the task of securely holding the magnets 6 and 7. Guide magnets, a central holding magnet 8 and a ring magnet 9 that are spaced apart by an insulation ring 11, are disposed in the center of the electric rotor. These guide magnets cooperate with correspondingly constructed guide magnets on the stator side of the single-motor drive. Other details of this kind of single-motor drive of a synchronously operated axial field motor may be found, for instance, in Published International Application WO 92/01096, and therefore need not be shown or described in further detail herein.

A bottom 2' of the spinning cup 2 is formed of a ferromagnetic material, and accordingly entirely or partially forms a yoke for the drive magnets 6 and 7. The resultant magnetic flux assures a strong axial force between the electric rotor 1 and the spinning cup 2. The intensity of the magnetic attraction can also be influenced by providing that the bottom 2' of the spinning cup 2 is not the only yoke for the drive magnets 6 and 7. For instance, if the supporting layer 13 oriented toward the spinning cup 2 of the electric rotor 1 is likewise made of a ferromagnetic material, then the magnetic flux is split between this supporting layer 13 and the bottom 2' of the spinning cup 2.

The desired magnetic adhesion can be adjusted purposefully by means of a ratio of the thickness of the two yoke components. In this case, the supporting layer 13 is glued to the components of the electric rotor 1 which contact it.

Due to the axial magnetic force, which is further reinforced in combination with the magnetic flux on the part of the stator, the coupling of the parts cannot readily be undone counter to the direction of the magnetic force of attraction. If the spinning cup 2 is to be disconnected from the electric rotor 1, then it is necessary to reinforce the overcoming of axial attraction by means of form-locking. This is attained in the example described by rotating the spinning cup 2 and electric rotor 1 relative to one another in such a way that the respective backs 5 and 15 of the drivers 3 and the indentations 14 slide on one another. The torque required for this must be greater than the torque that occurs when the spinning rotor is braked, so as to reliably avoid disconnection of the parts during braking. However, this is no problem because of the high stator currents that occur especially during braking, since then the magnetic attraction is still substantially reinforced.

Figure 2A:
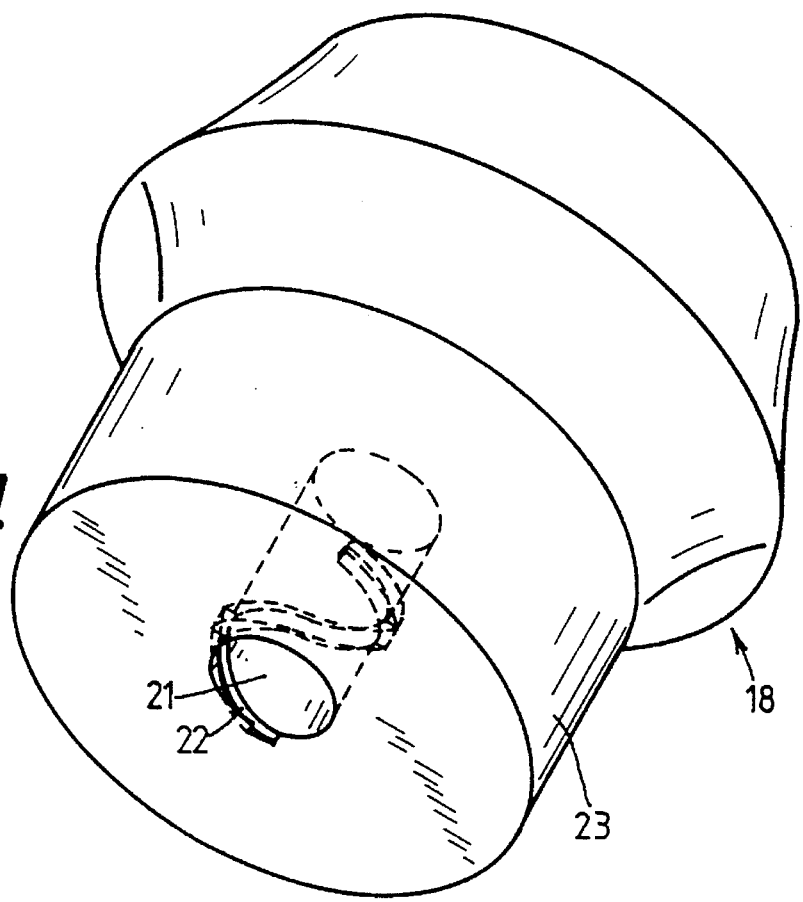
FIG. 2a is a perspective view of a spinning cup according to a variant of the invention.
Figure 2B:
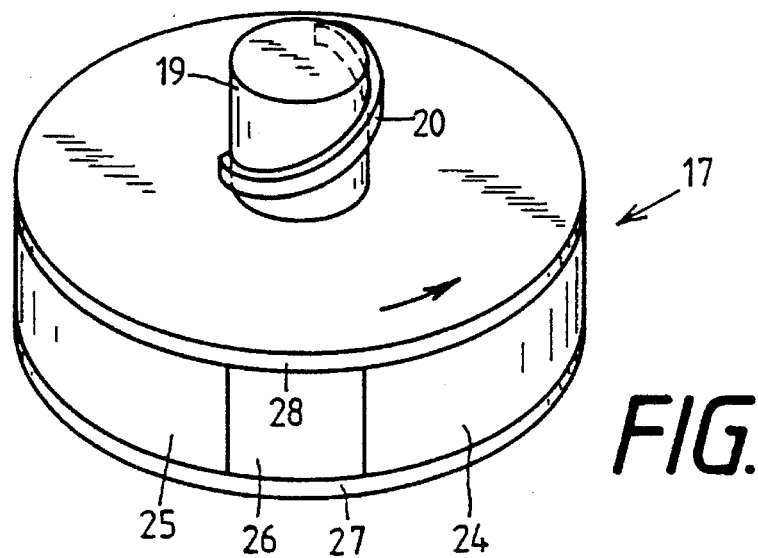
FIG. 2b is a perspective view of an electric rotor associated with the spinning cup.

In a second variant of the invention shown in FIGS. 2a and 2b, a bolt 19, which has a web or land 20 extending in corkscrew fashion, protrudes centrally from an electric rotor 17. In order to fit this web or land, a spinning cup 18 has an indentation 21, which has a groove 22 corresponding to the web or land 20.

Like the spinning cup 2 of the first example, the spinning cup 18 has a ferromagnetic bottom 23, which in this case as well acts as a magnet yoke for drive magnets 24 and 25.

Analogously to the first example, a barrier layer 26 is disposed between the drive magnets 24 and 25. Supporting layers 27 and 28 embed the magnet arrays. The magnets for developing guiding magnetic fields are not shown in this case but correspond to the first example.

A pitch of the web or land 20 and the groove 22 is chosen in such a way that as yet, no self-locking connection occurs. However, through the use of the drive of the electric rotor 17, the spinning cup 18 and the electric rotor 17 are additionally pressed together by form-locking. When braking, the pitch of the web or land 20 and the groove 22 functions in just the same way as the slope of the drivers in the first example, so that in this case the axial magnetic force prevents disconnection of the two parts. However, if separation or disconnection of the parts is intended, the axial magnetic force can readily be overcome by turning them.

Figure 3A:
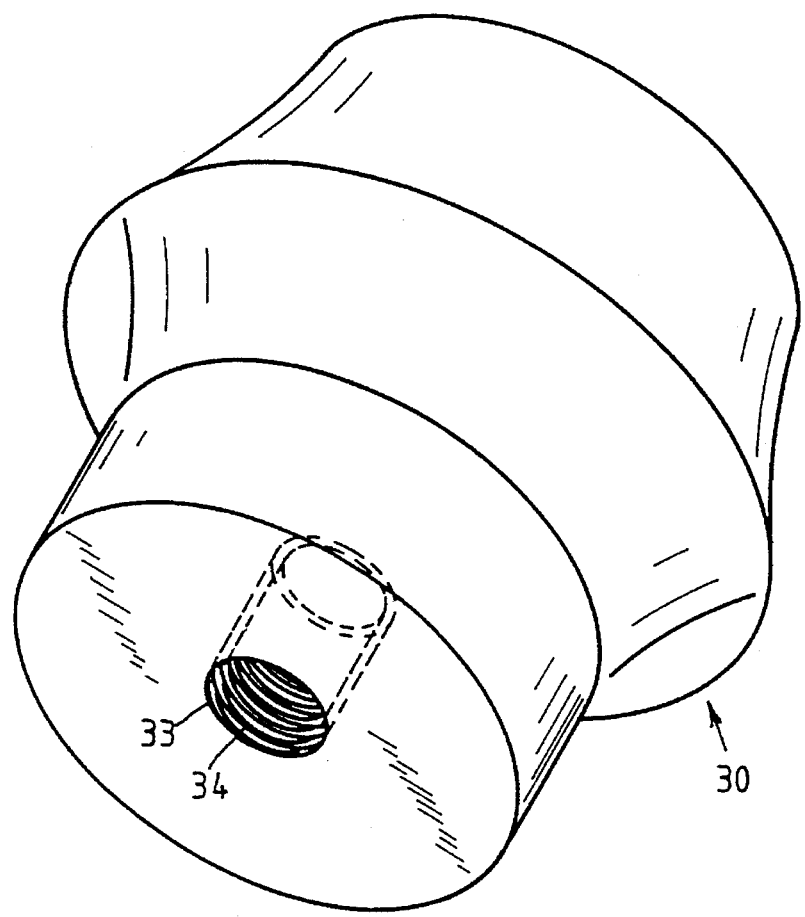
FIG. 3a is a perspective view of a spinning cup according to another variant of the invention.
Figure 3B:
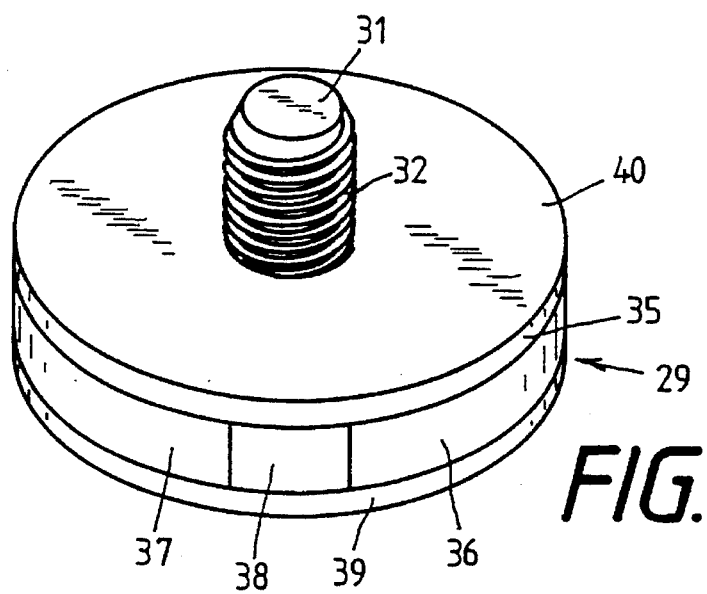
FIG. 3b is a perspective view of an electric rotor associated with the spinning cup.

In a further example shown in FIGS. 3a and 3b, a bolt 31 that has an external thread 32 protrudes from an electric rotor 29. An indentation 33 made in a corresponding spinning cup 30 has a matching internal thread 34. A thread pitch is chosen to be so flat that a self-locking connection between the spinning cup and the electric rotor 29 results. Accordingly, once again it is possible to make the spinning cup 30 solely from a nonmagnetic material. A magnetic short circuit is effected in this case by means of a yoke 35, which is disposed in the electric rotor 29. This yoke 35 conducts the magnetic flux between drive magnets 36 and 37, which in turn in this case as well are separated from one another by a barrier layer 38. Supporting layers 39 and 40 join together the electric rotor 29 as a whole.

Figure 4A:
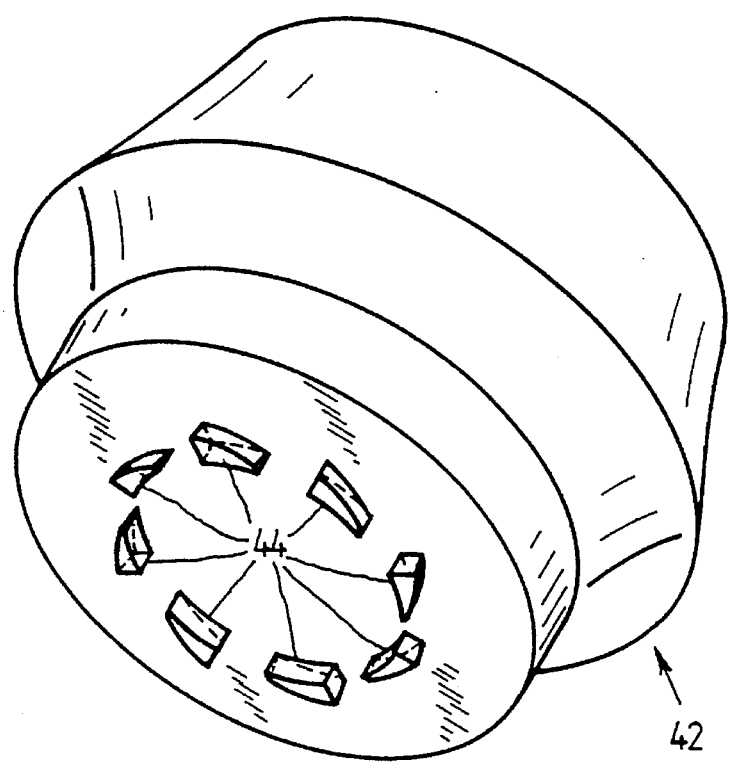
FIG. 4a is a perspective view of a spinning cup according to a further variant of the invention.
Figure 4B:
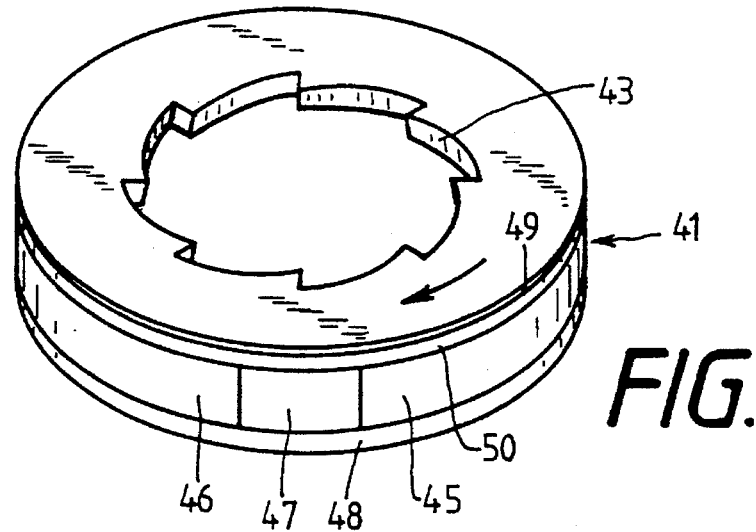
FIG. 4b is a perspective view of an electric rotor associated with the spinning cup.

In a fourth example shown in FIGS. 4a and 4b, an electric rotor 41 has a concentric configuration of involutes 43. These involutes may additionally have an undercut, which assures that at the same time an axial force is employed in the joining with suitably constructed teeth 44, that are disposed on the bottom of the spinning cup 42. For that purpose, these teeth 44 are inclined radially outward, so that they can engage the undercut in the joining operation.

In this case as well, there is accordingly no need for the bottom of the spinning cup 42 itself to form the yoke for drive magnets 45 and 46. However, the possibility does exist of making do without an undercut and of constructing the bottom of the spinning cup 42 as a yoke.

Once again, the drive magnets 45 and 46 are separated from one another by a barrier layer 47 and are embedded in supporting layers 48 and 49.

Figure 5A:
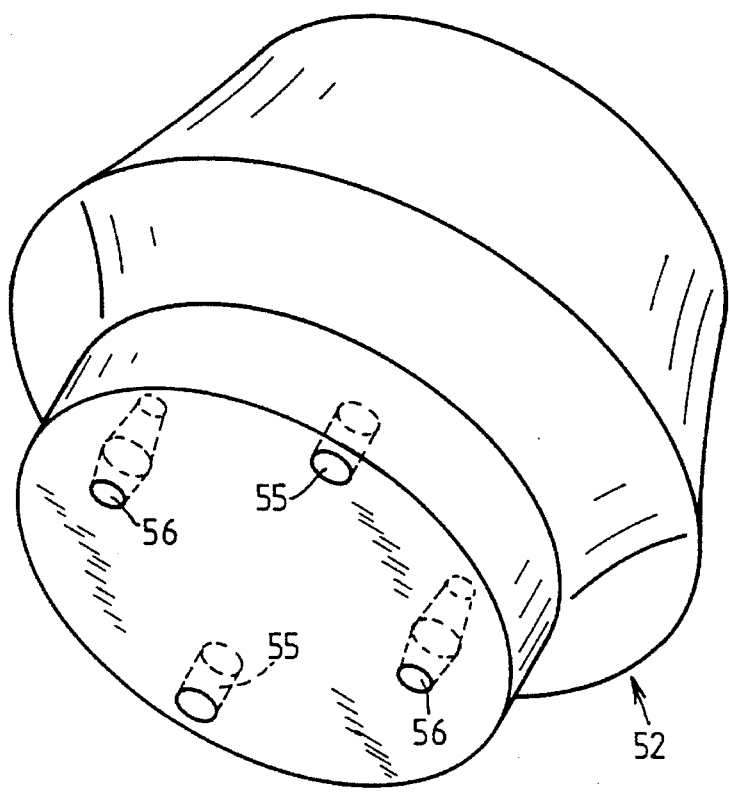
FIG. 5a is a perspective view of an additional variant of a spinning cup according to the invention.
Figure 5B:
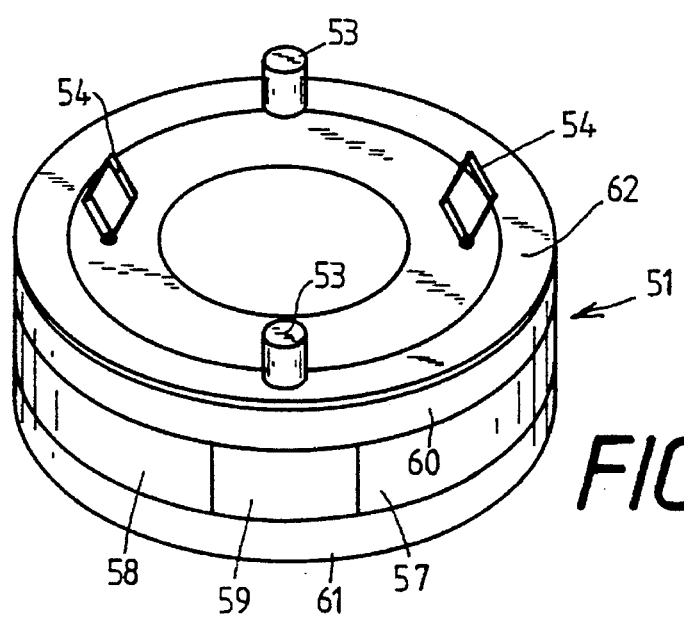
FIG. 5b is a perspective view of an electric rotor associated with spinning cup.

In a fifth variant of the invention shown in FIGS. 5a and 5b, an electric rotor 51 has driver bolts 53 and springs 54. The driver bolts 53 engage corresponding bores 55 on the side of a spinning cup 52, while the springs 54 engage undercut openings 56 in the spinning cup. The drivers 53 thus take on the function of both centering and transmitting torque, while the springs 54 in conjunction with the openings 56 serve to achieve the appropriate axial force.

In this example as well, it is unnecessary to conduct the magnetic flux through the spinning cup 52, which accordingly may be made entirely of a nonmagnetic material. Drive magnets 57 and 58, which are separated from one another by a barrier layer 59, are joined to one another through a yoke 60 of the electric rotor 51. Once again, supporting layers 61 and 62 assure that the electric rotor 51 is held together.

At this point it should be mentioned that in the description of the electric rotors, no particular attention was devoted to describing the exact structure of the electric rotors. Accordingly, within the scope of this invention it is readily possible to use electric rotors having a structure which is different. Care must merely be taken to ensure that in the event that the magnetic force is required at least to attain the requisite axial force for holding the components together, the magnetic flux must be conducted through the spinning cup, and therefore at least the bottom of the spinning cup must be formed of a material that conducts the magnetic flux.

Figure 6:
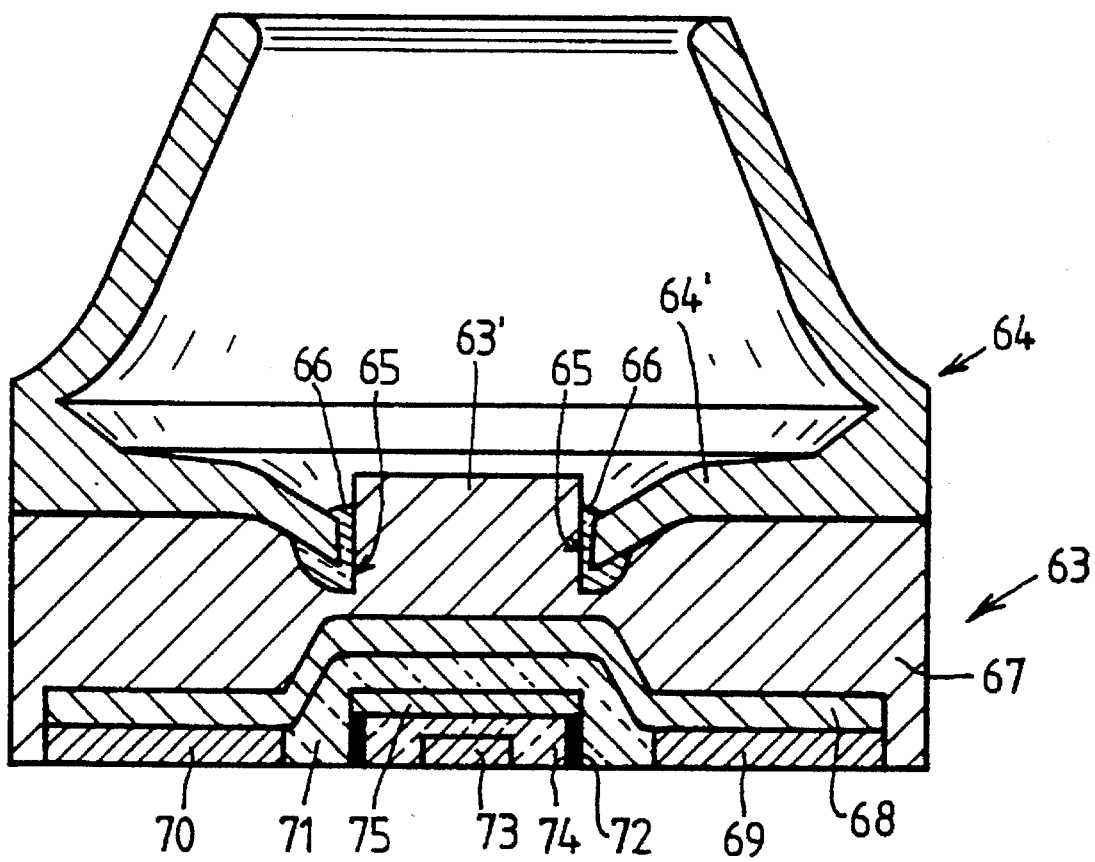
FIG. 6 is a cross-sectional view of a spinning rotor, in which the spinning cup and the electric rotor are joined to one another by an adhesive connection.

In a final variant of the invention, which is shown in FIG. 6, an adhesive connection was chosen for joining a spinning cup 64 to an electric rotor 63. The electric rotor 63 has a base 63', on the edge of which a throat 65 is produced, into which an adhesive 66 can be placed. A bottom 64' of the spinning cup 64 has a corresponding annular recess, which can be slipped over the base 63'.

If the spinning cup 64 must be replaced because of wear, then there is also no objection to destroying the spinning cup 64 itself as it is separated from the electric rotor 63. As a result, undoing the adhesive connection is also possible, relatively without problems.

The electric rotor 63 is shown in this case in a sectional view, and it can be seen that a yoke 68 for drive magnets 69 and 70 is spatially separate from a yoke 75 for guide magnets 72 and 73. An insulating layer 71 in between assures a magnetic decoupling of the two magnet systems. As a result the alternating field conducted through the yoke 68 is not transmitted to the guide magnet field. This prevents an asymmetrical shift in the magnetic axis of rotation.

Disposed between the guide magnets 72 and 73 is an annular magnetic insulator 74, which separates the two magnetic fields from one another. A supporting layer 67 assures the holding together of the electric rotor 63. Particularly in the dimensioning of the supporting layer 67, a layer thickness that might exceed a practicably usable layer thickness was chosen, for the sake of simplicity.

Figure 7:
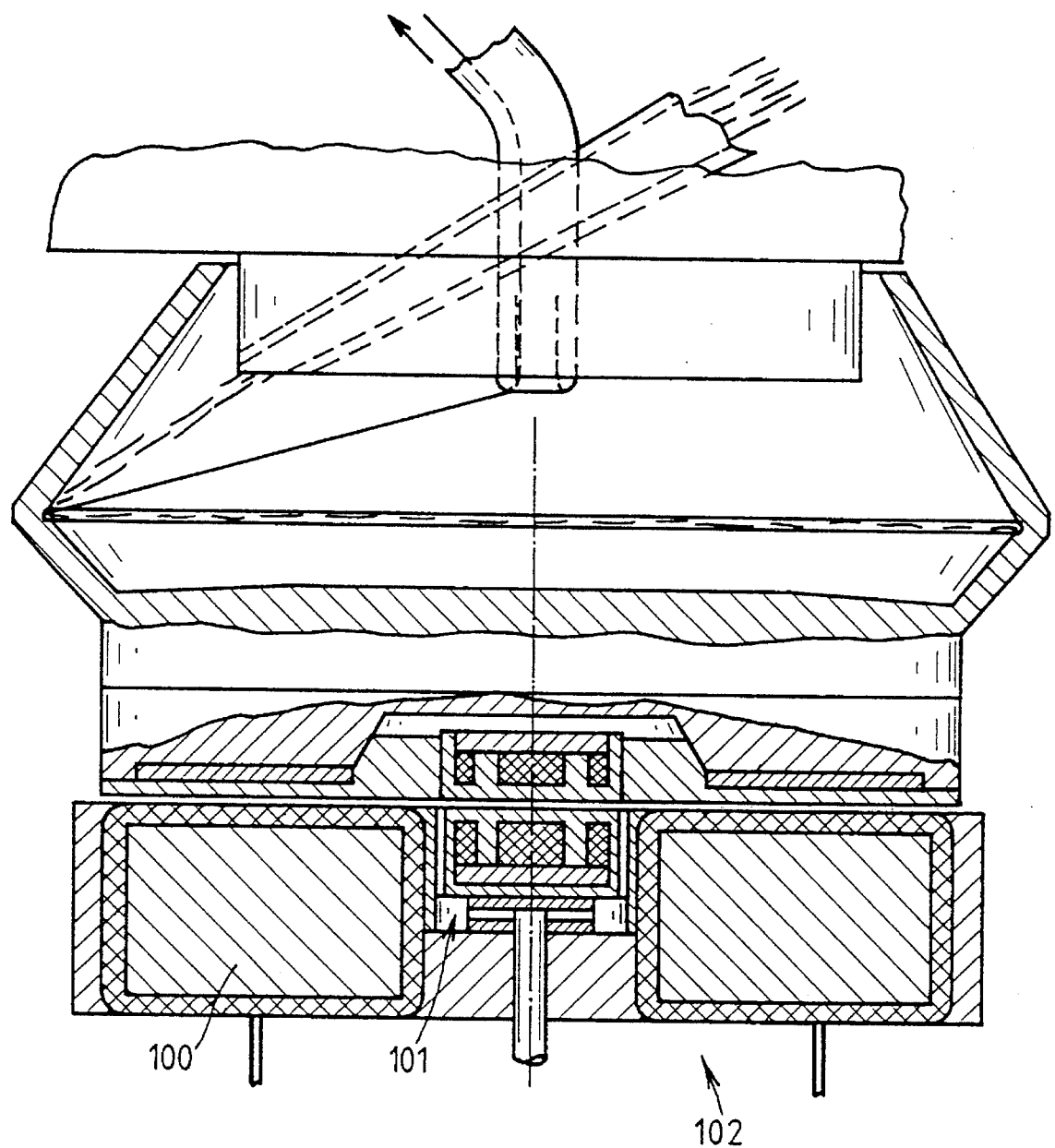
FIG. 7 is an axial cross-section through a shaftless spinning rotor where the rotor, i.e. the armature, of an axial field motor is the individual drive of the rotor.
Figure 9:
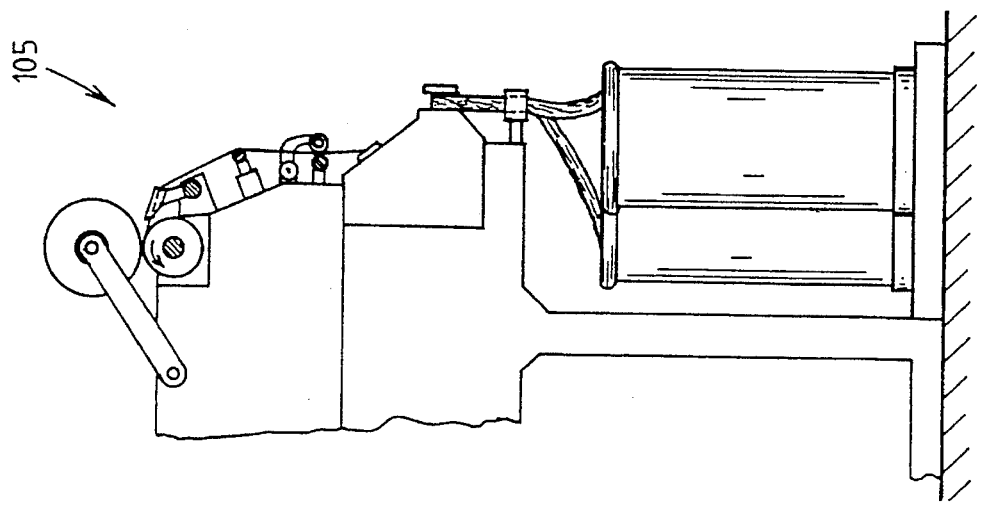
FIG. 9 is a fragmentary, diagrammatic, side-elevational view thereof.
Figure 8:
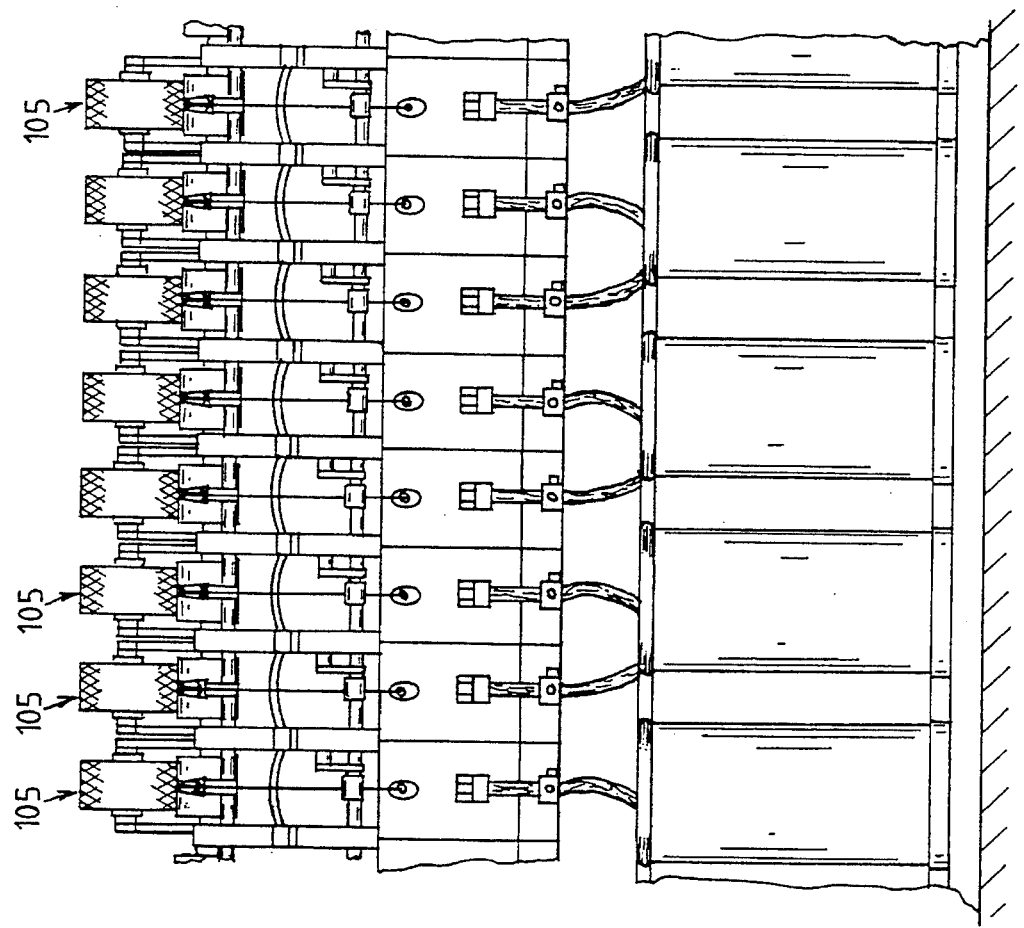
FIG. 8 is a fragmentary, front-elevational view of an open-end spinning machine with several work stations.

FIG. 7 shows a cross-section of the shaftless spinning rotor with stator 100, gas bearing 101, and single motor 102. FIGS. 8 and 9 show a plurality of spinning stations 105.

We claim:

1. In an open-end spinning machine having spinning stations and a magnetic and gas bearing with a stator at each of the spinning stations, a shaftless spinning rotor, comprising:

a series of spinning cups with different properties at each of the spinning stations for receiving fibers to be spun; and an electric rotor at each of the spinning stations forming an axial field motor with the magnetic and gas bearing and the stator, said axial field motor individually driving a respective one of said spinning cups;

said spinning cups and said electric rotor having axially opposing end surfaces relative to a common axis of said spinning cups and said electric rotor, and said end surfaces of said electric rotor and of one of said spinning cups at a time being coupled together to form a functionally appropriately releasable connection as a structural unit at each of the spinning stations, wherein said releasable connection is formed by magnetic adhesion.

2. The shaftless open-end spinning rotor according to claim 1, wherein said electric rotor is a drive and bearing part for said spinning cups, said spinning cups have bottoms facing toward said drive and bearing part, and said bottoms are formed of a ferromagnetic material at least partially forming a yoke for magnetic field lines.

3. The shaftless open-end spinning rotor according to claim 1, wherein said spinning cups and said electric rotor have cooperating form-locking elements for centering and torque transmission.

4. The shaftless open-end spinning rotor according to claim 3, wherein said form-locking elements include drivers protruding from one of said coupled opposing end surfaces and indentations, formed in the other of said coupled opposing end surfaces for receiving said drivers.

5. The shaftless open-end spinning rotor according to claim 4, wherein said drivers are disposed on said electric rotor, and said indentations are formed in said spinning cups.

6. The shaftless open-end spinning rotor according to claim 1, wherein said coupled electric rotor and said spinning cups have a configuration of intermeshing coupling elements for simultaneously absorbing torque and radial and axial forces.

7. The shaftless open-end spinning rotor according to claim 6, wherein said electric rotor has an axis, and said coupling elements are disposed in the vicinity of said rotor axis.

8. The shaftless open-end spinning rotor according to claim 7, wherein said coupling elements include a bolt with a corkscrew-like surface and an indentation having a shape being adapted to said corkscrew-like surface.

9. The shaftless open-end spinning rotor according to claim 7, wherein said coupling elements include a self-locking screw connection.

10. The shaftless open-end spinning rotor according to claim 7, wherein said coupling elements have concentric involute configurations.

11. In an open-end spinning machine having spinning stations and a magnetic and gas bearing with a stator at each of the spinning stations, a shaftless spinning rotor, comprising:

a series of spinning cups with different properties at each of the spinning stations for receiving fibers to be spun; and an electric rotor at each of the spinning stations forming an axial field motor with the magnetic and gas bearing and the stator, said axial field motor individually driving a respective one of said spinning cups;

said spinning cups and said electric rotor having axially opposing end surfaces relative to a common axis of said spinning cups and said electric rotor, and said end surfaces of said electric rotor and of one of said spinning cups at a time being coupled together to form a functionally appropriately releasable connection as a structural unit at each of the spinning stations, said spinning cups and said electric rotor have cooperating form-locking elements for centering and torque transmission, said form-locking elements include drivers protruding from one of said coupled opposing end surfaces and indentations, formed in the other of said coupled opposing end surfaces for receiving said drivers, wherein said drivers each have a steep lateral surface spaced radially apart from a rotary axis of said spinning cup, and said indentations each have a corresponding steep lateral surface against which said steep lateral surfaces of said drivers are pressed when the spinning rotor is driven.

12. The shaftless open-end spinning rotor according to claim 11, wherein said drivers and said indentations have extensions beginning concentrically with the pivot axis at said steep lateral surfaces, and said extensions have a matchingly decreasing height.

13. In a shaftless open-end spinning rotor having an electric rotor rotatable about an axis and having an end surface, a spinning cup rotable about the axis, comprising an end surface with an outer edge, said end surface of said spinning cup being axially opposed to the end surface of the electric rotor, and means for functionally releasably connecting the end surface of the spinning cup to the end surface of the electric rotor, said means including drivers protruding from one of said coupled opposing end surfaces, and indentations formed in the other of said coupled opposing end surfaces for receiving said drivers, said drivers and indentations being radially spaced apart from the axis and from the outer edge of the end surface.

14. In an open-end spinning machine having spinning stations and a magnetic and gas bearing with a stator at each of the spinning stations, a shaftless spinning rotor, comprising:

a series of spinning cups with different properties at each of the spinning stations for receiving fibers to be spun; and an electric rotor at each of the spinning stations forming an axial field motor with the magnetic and gas bearing and the stator, said axial field motor individually driving a respective one of said spinning cups;

said spinning cups and said electric rotor having axially opposing end surfaces relative to a common axis of said spinning cups and said electric rotor, and said end surfaces of said electric rotor and of one of said spinning cups at a time being coupled together to form a functionally appropriately releasable connection as a structural unit at each of the spinning stations, said spinning cups and said electric rotor have cooperating form-locking elements including drivers protruding from one of said coupled opposing end surfaces, and indentations formed in the other of said coupled opposing end surfaces for receiving said drivers, said drivers and said indentations being radially spaced apart from a rotary axis and from an edge of the opposing end surfaces.

* * * * *